(12) United States Patent
Oh et al.

(10) Patent No.: US 11,576,490 B2
(45) Date of Patent: *Feb. 14, 2023

(54) EXTERNAL DETECTION SEE-THROUGH DOOR AND EXTERNAL DETECTION SEE-THROUGH CABINET HAVING SAME

(71) Applicant: INTOSEE CO. LTD, Cheonan-si (KR)

(72) Inventors: Jae Hwan Oh, Cheonan-si (KR); Chan Ho Kim, Cheonan-si (KR)

(73) Assignee: INTOSEE CO. LTD, Cheonan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/274,686

(22) PCT Filed: Jul. 12, 2019

(86) PCT No.: PCT/KR2019/008654
§ 371 (c)(1),
(2) Date: Mar. 9, 2021

(87) PCT Pub. No.: WO2020/067635
PCT Pub. Date: Apr. 2, 2020

(65) Prior Publication Data
US 2022/0031071 A1 Feb. 3, 2022

(30) Foreign Application Priority Data

Sep. 28, 2018 (KR) .......................... 10-2018-0116398

(51) Int. Cl.
A47B 96/20 (2006.01)
H05B 47/115 (2020.01)
(Continued)

(52) U.S. Cl.
CPC ............ *A47B 96/20* (2013.01); *G02B 5/3025* (2013.01); *H05B 47/11* (2020.01); *H05B 47/115* (2020.01); *A47B 2220/0077* (2013.01)

(58) Field of Classification Search
CPC . A47B 96/20; A47B 2220/0077; A47B 61/00; G02B 5/3025; G02B 5/20;
(Continued)

(56) References Cited

U.S. PATENT DOCUMENTS

2015/0026951 A1* 1/2015 Orsley ...................... E06B 3/54
427/163.1
2017/0191745 A1* 7/2017 Choi ........................ B29C 44/18

FOREIGN PATENT DOCUMENTS

JP 2006-169861 A 6/2006
KR 20-0327552 Y1 9/2003
(Continued)

*Primary Examiner* — Renan Luque
(74) *Attorney, Agent, or Firm* — Novick, Kim & Lee PLLC; Jae Youn Kim

(57) ABSTRACT

One embodiment of the present disclosure provides an external detection see-through door of a cabinet that stores objects. The external detection see-through door includes a transmission window, a sensor configured to detect a specific external condition in front of the transmission window, a light emitting module configured to increase an amount of emitted light according to a signal from the sensor, which has detected the specific external condition, to increase an amount of light that is reflected from inside the cabinet and heads toward the transmission window, and an optical film that is provided on the transmission window and has a light transmittance that prevents the cabinet from being see-through from the outside before the sensor detects the specific condition and allows the cabinet to be see-through from the outside due to light that is reflected from inside the cabinet and transmitted through the transmission window and the optical film due to the light emitting module increasing the amount of emitted light according to the signal from the sensor that has detected the specific external condition.

6 Claims, 6 Drawing Sheets

(51) Int. Cl.
*H05B 47/11* (2020.01)
*G02B 5/30* (2006.01)

(58) Field of Classification Search
CPC ......... H05B 47/11; H05B 47/115; E06B 5/00; E06B 7/30; E06B 5/006; F21V 23/04; F21V 23/0442
See application file for complete search history.

(56) References Cited

FOREIGN PATENT DOCUMENTS

| KR | 10-2013-0023416 A | 3/2013 | |
|----|----|----|----|
| KR | 10-2014-0078379 A | 6/2014 | |
| KR | 10-1632300 B1 | 6/2016 | |
| KR | 1632300 B1 * | 6/2016 | ............. A47B 95/00 |

* cited by examiner

EXTERNAL DETECTION SEE-THROUGH DOOR AND EXTERNAL DETECTION SEE-THROUGH CABINET HAVING SAME

TECHNICAL FIELD

The present disclosure relates to an external detection see-through door and an external detection see-through cabinet having the same, and more particularly, to an external detection see-through door, which becomes see-through to allow the interior to be visible when a specific external condition is detected, and a cabinet having the same.

BACKGROUND ART

Generally, clothes or household items such as dishes are stored in storage boxes having a door, such as a closet or a cabinet. Such storage boxes generally have a door through which light is not transmitted to block sunlight or to improve the aesthetics of the interior. For this reason, there is no way to check an internal condition thereof other than a method of opening the door to check the interior, or it is difficult to know the internal condition unless a special device is used, and thus there is a problem in that it is inconvenient. Opaque doors may also be adopted for buildings to ensure security or the like, but, in some cases, it may be necessary to check whether there is a person on the other side of the door without opening the door.

DISCLOSURE

Technical Problem

The present disclosure is directed to providing an external detection see-through door, which becomes see-through in a case in which a specific external condition such as an approach of a person or a change in lighting is detected, and a cabinet having the same.

Objectives of the present disclosure are not limited to the above-mentioned objectives, and other unmentioned objectives should be clearly understood by those of ordinary skill in the art to which the present disclosure pertains from the description below.

Technical Solution

One embodiment of the present disclosure provides an external detection see-through door of a cabinet that stores objects. The external detection see-through door includes a transmission window, a sensor configured to detect a specific external condition in front of the transmission window, a light emitting module configured to increase an amount of emitted light according to a signal from the sensor, which has detected the specific external condition, to increase an amount of light that is reflected from inside the cabinet and heads toward the transmission window, and an optical film that is provided on the transmission window and has a light transmittance that prevents the cabinet from being see-through from the outside before the sensor detects the specific condition and allows the cabinet to be see-through from the outside due to light that is reflected from inside the cabinet and transmitted through the transmission window and the optical film due to the light emitting module increasing the amount of emitted light according to the signal from the sensor that has detected the specific external condition.

In an embodiment of the present disclosure, the sensor may include at least one of a light sensor configured to detect a change in light due to an external object in front of the transmission window and a touch sensor configured to detect the external object due to a touch by the external object.

In an embodiment of the present disclosure, the external detection see-through door may include a switch configured to turn a power supply to the sensor or the light emitting module on and off or turn the sensor on and off to turn a see-through function on and off.

In an embodiment of the present disclosure, the transmission window may include an external transmission window and an internal transmission window that are opposite to each other, the light emitting module may be provided on an edge of the door to emit light between the external transmission window and the internal transmission window, and the optical film may be provided only on the external transmission window among the external transmission window and the internal transmission window and may include one or more reflective films.

In an embodiment of the present disclosure, the transmission window may include an external transmission window and an internal transmission window that are opposite to each other, the light emitting module may be provided on an edge of the door to emit light between the external transmission window and the internal transmission window, and the optical film may include an external optical film provided on the external transmission window and an internal optical film that is provided on the internal transmission window and has a light transmittance higher than that of the external optical film.

In an embodiment of the present disclosure, the transmission window may include an external transmission window and an internal transmission window that are opposite to each other, and the light emitting module may include a light emitting element provided on an edge of the door to emit light according to a signal from the sensor and a light guide member configured to guide and diffuse the light from the light emitting element to between the external transmission window and the internal transmission window.

In an embodiment of the present disclosure, total light transmittance due to the one or more reflective films of the optical film provided on the external transmission window may be in a range of 1% to 15%.

In an embodiment of the present disclosure, the external optical film may include one or more first reflective films, the internal optical film may include one or more second reflective films, total light transmittance due to the one or more first reflective films may be in a range of 1% to 15%, and total light transmittance due to the one or more second reflective films may be 50% or higher.

In an embodiment of the present disclosure, at least one of the external optical film and the internal optical film may be a reflective polarizing film.

Another embodiment of the present disclosure provides an external detection see-through cabinet that stores objects. The external detection see-through cabinet includes a cabinet body configured to store objects and an external detection see-through door installed on the cabinet body. The external detection see-through door includes a transmission window, a sensor configured to detect a specific external condition in front of the transmission window, a light emitting module configured to increase an amount of emitted light according to a signal from the sensor, which has detected the specific external condition, to increase an amount of light that is reflected from inside the cabinet and heads toward the transmission window, and an optical film that is provided on the transmission window and has a light transmittance that prevents the cabinet from being see-through from the outside before the sensor detects the specific condition and allows the cabinet to be see-through from the outside due to light that is reflected from inside the cabinet and transmitted through the transmission window and the optical film due to the light emitting module increasing the amount of emitted light according to the signal from the sensor that has detected the specific external condition.

Advantageous Effects

According to an embodiment of the present disclosure, since an external detection see-through door and a cabinet having the same become see-through when a specific external condition is detected, objects inside the cabinet can be checked without opening the door, and thus it is convenient to use.

The advantageous effects of the present disclosure are not limited to the above and should be understood as including all the advantageous effects that may be inferred from configurations of the disclosure that are described in the detailed description or claims of the present disclosure.

BEST MODE OF THE DISCLOSURE

Figure 1:
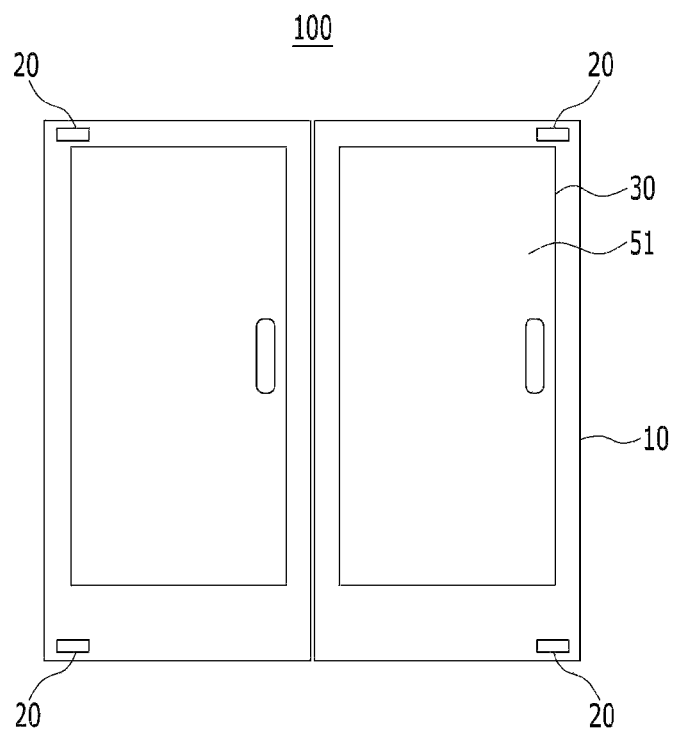
FIG. 1 is a view for describing a cabinet having an external detection see-through door according to an embodiment of the present disclosure.

Hereinafter, the present disclosure will be described with reference to the accompanying drawings. However, the present disclosure may be implemented in various different forms and thus is not limited to embodiments described herein. Also, parts unrelated to the description have been omitted to clearly describe the present disclosure, and like elements are denoted by like reference numerals throughout the specification.

Throughout the specification, when a certain part is mentioned as being "connected to (linked to, in contact with, coupled to)" another part, this not only includes a case in which the certain part is "directly connected" to the other part but also includes a case in which the certain part is "indirectly connected" to the other part while another member is disposed therebetween. Also, when a certain part is mentioned as "including" a certain element, unless particularly stated otherwise, this indicates that the certain part may further include another element instead of excluding another element.

Terms used in the present specification are only used to describe specific embodiments and are not intended to limit the present disclosure. A singular expression includes a plural expression unless the context clearly indicates otherwise. In the present specification, terms such as "include" or "have" should be understood as specifying that features, numbers, steps, operations, elements, components, or combinations thereof are present and not as precluding the possibility of the presence or addition of one or more other features, numbers, steps, operations, elements, components, or combinations thereof in advance.

Hereinafter, embodiments of the present disclosure will be described in detail with reference to the accompanying drawings.

Figure 2:
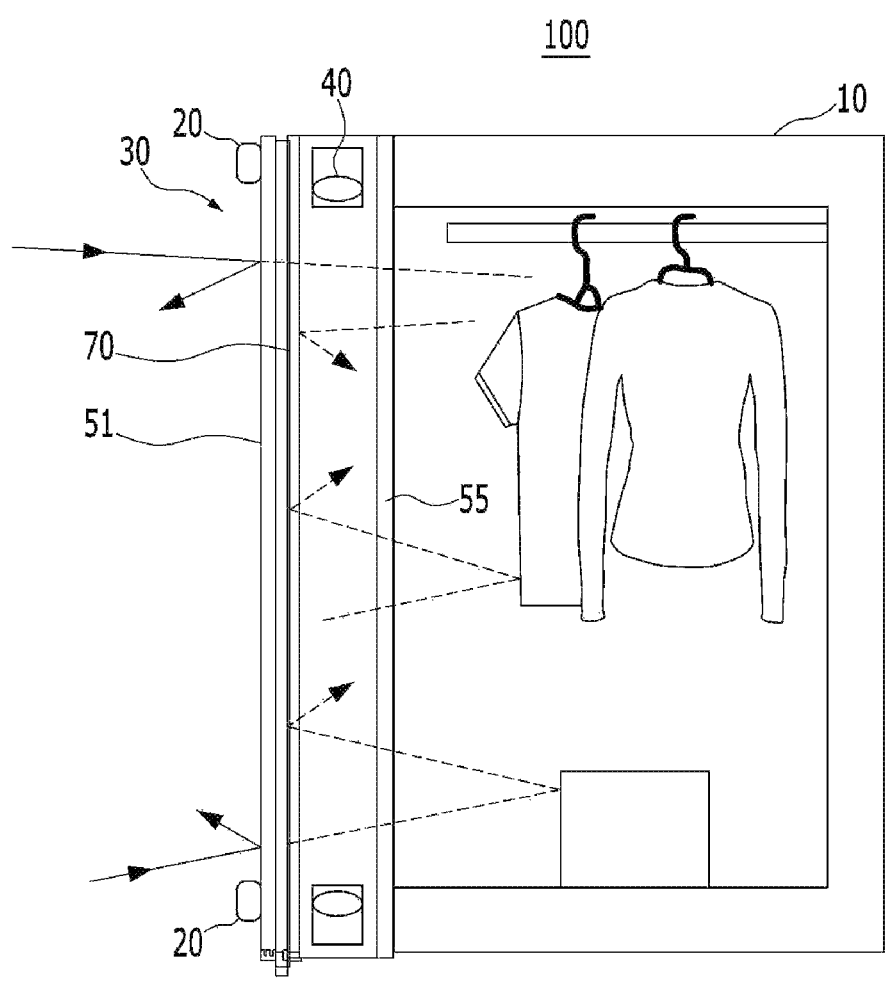
FIG. 2 is a view for describing the cabinet in ordinary times according to an embodiment.

FIG. 1 is a view for describing a cabinet having an external detection see-through door according to an embodiment of the present disclosure. FIG. 2 is a view for describing the cabinet in ordinary times according to an embodiment.

Referring to FIGS. 1 and 2, an external detection see-through cabinet 100 includes a cabinet body 10 and an external detection see-through door 30. Clothes, kitchen utensils, or other household items may be stored in the cabinet body 10. The objects stored in the cabinet are not limited thereto, and medicine containers and dangerous substances such as a volatile substance may also be stored therein. The external detection see-through door 30 is installed on the cabinet body 10 and includes transmission windows 51 and 55, a sensor 20, a light emitting module 40, and an optical film 70.

In the present embodiment, the sensor 20 may be installed on an edge of an outer side surface of the door 30 but may also be installed on another portion of the door 30 or installed on the cabinet body 10. The sensor 20 may detect a specific condition, e.g., an approach of a person, a specific movement of a person, or a change in illuminance, outside the cabinet. The sensor 20 that has detected the specific external condition may transmit a signal to the light emitting module 40 via a wire or wirelessly. The transmission windows 51 and 55 may be made of, for example, transparent glass or resin (e.g., polycarbonate). According to the signal from the sensor 20 that has detected the specific condition outside the cabinet, the light emitting module 40 emits light or increases an amount of emitted light to increase an amount of light that is reflected from inside the cabinet and heads toward the transmission windows 51 and 55. This will be further described below. The optical film 70 is provided on the transmission window 51 and has a light transmittance in a predetermined range. For example, the light transmittance of the optical film 70 is selected so that, when the light emitting module 40 is turned off, the cabinet is not see-through from the outside under a normal sunlight or lighting condition. Also, the light transmittance of the optical film 70 is selected so that, when the light emitting module 40 emits light, light that is output from the light emitting module 40, reflected from the optical film 70 or the transmission windows 51 and 55, and irradiated into the cabinet is reflected from inside the cabinet such that the amount of light transmitting through the transmission windows 51 and 55 and the optical film 70 is increased and the cabinet is see-through from the outside. Accordingly, the external detection see-through door 30 blocks sunlight or indoor lighting in ordinary times and becomes see-through when any above-mentioned specific condition outside the cabinet is detected. Therefore, clothes, household items, or the like stored in the cabinet body 10 may be checked without opening the external detection see-through door.

Figure 3:
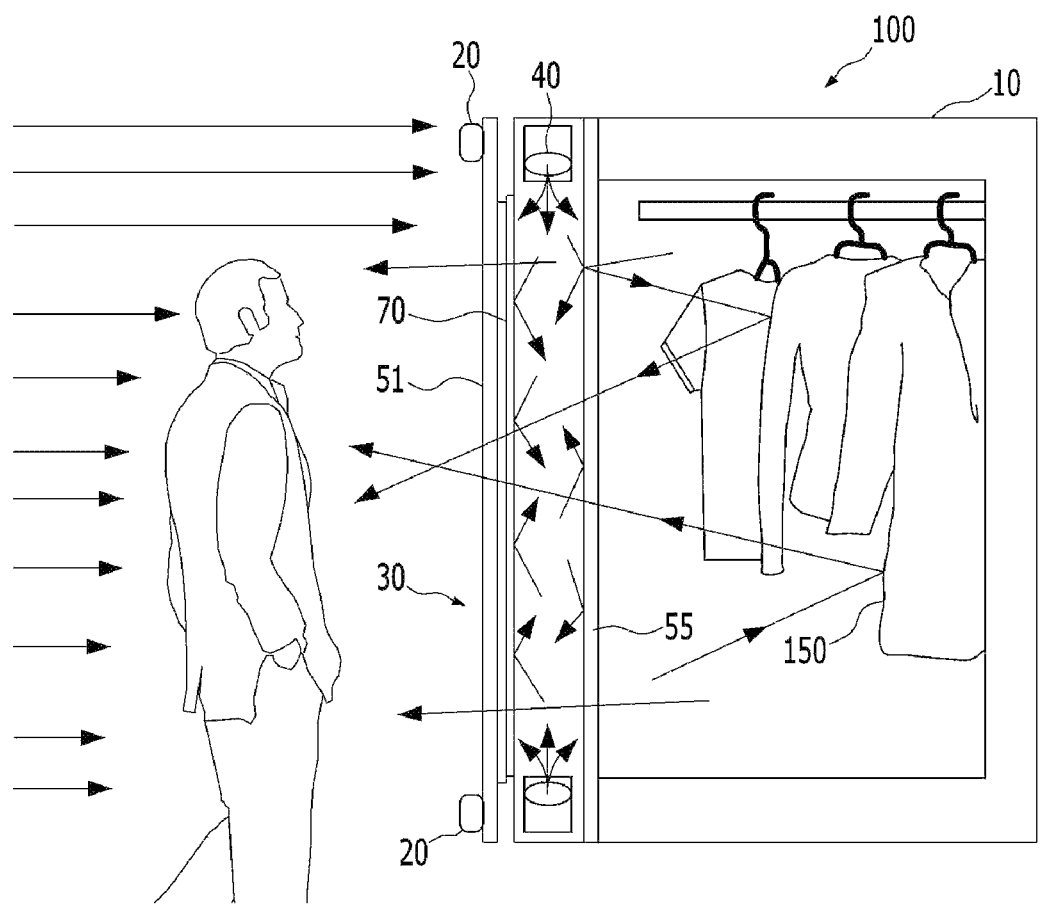
FIG. 3 is a view for describing the see-through cabinet when an external condition is detected in the external detection see-through cabinet of FIG. 2.

FIG. 3 is a view for describing the see-through cabinet when an external condition is detected in the external detection see-through cabinet of FIG. 2.

In the present embodiment, the transmission windows 51 and 55 include an external transmission window 51 and an internal transmission window 55 that are opposite to each other. The internal transmission window 55 is provided between the external transmission window 51 and the cabinet body 10. The light emitting module 40 may be provided on, for example, an edge of the door 30 to emit light between the external transmission window 51 and the internal transmission window 55 according to a signal from the sensor 20. The light emitting module 40 may include a light emitting diode (LED).

In the present embodiment, the optical film 70 is provided only on the external transmission window 51 among the external transmission window 51 and the internal transmission window 55. In FIG. 3, the optical film 70 is attached to an inner side surface of the external transmission window 51. Of course, unlike this, the optical film 70 may also be provided on an outer surface of the external transmission window 51, but the optical film 70 being attached to the inner side surface of the external transmission window 51 may be more advantageous in protecting the optical film 70. The optical film 70 may include one or more reflective films and may be formed by overlapping two or three reflective films. The number of reflective films may vary according to the light transmittance of the reflective film. In order to prevent the cabinet from being see-through from the outside in ordinary times and allow the cabinet to be see-through when a specific external condition is detected, preferably, the total light transmittance of the optical film 70 due to light transmittances of the one or more reflective films is in a range of 1% to 15%.

The sensor 20 may include at least one of a light sensor configured to detect a change in light and a non-contact type sensor such as a movement sensor configured to detect movement of an object. For example, in a case in which the sensor 20 is a light sensor, when a person approaches the door from in front of the door as illustrated in FIG. 3, the sensor 20 may detect the approach. For example, in a case in which the sensor 20 is a light-receiving element, an amount of light received by the sensor 20 is changed due to the approaching person, and the sensor 20 generates a specific condition detection signal. Unlike this, the sensor 20 may radiate predetermined light and detect a change in light reflected from the front of the door 30 to detect an approach of a person. Unlike this, in a case in which the sensor 20 is a movement sensor, the sensor 20 may detect a specific movement of a person, e.g., a movement of a person moving his or her arm left and right, and generate a specific condition detection signal. For such detections, a plurality of sensors 20 may be installed at suitable places on the door 30. In the example illustrated in FIG. 3, light heading toward a sensor 20 at an upper side is not blocked by a person, but light heading toward a sensor 20 at a lower side is blocked by the person and thus an amount of light received by the sensor 20 at the lower side decreases. In this case, a difference between an amount of light received by the sensor 20 at the upper side and an amount of light received by the sensor 20 at the lower side may be detected to detect an approach of a person. The plurality of sensors 20 may be installed on the door 30 in a height direction, a difference in the amount of received light may be detected between the plurality of sensors 20 to determine a height of a person who has approached, and the light emitting module 40 may be set to emit light only when the determined height of the person matches a height of a person who has been pre-registered or input as a user of the corresponding external detection see-through cabinet 100. In this way, security of the external detection see-through cabinet 100 may also be secured to some extent. Alternatively, the sensors may be set when a person is being registered as a user, and the height of the user detected by the plurality of sensors 20 may be saved and registered. Alternatively, a sensor configured to detect body features other than height (fingerprint, iris, facial shape, etc.) may be used as the sensor, and only a specific user may register such body features to the sensor, and thus the cabinet may only be selectively see-through.

The sensor 20 that has detected such specific conditions transmit a signal to the light emitting module 40 via a wire or wirelessly. Here, since a method of transmitting a signal via a wire or wirelessly is a well-known art, further detailed description thereof will be omitted.

The light emitting module 40 outputs light according to a signal from the sensor 20, and the output light is reflected and transmitted as the light travels between the external transmission window 51 and the internal transmission window 55. In the present embodiment, since the optical film 70 is provided on the external transmission window 51 and the light transmittance of the external transmission window 51 is in a range of 1% to 15% as described above, a considerable amount of light is reflected from the optical film 70, transmitted through the internal transmission window 55, and irradiated into the cabinet. Through the process in which the light is reflected from the optical film 70, the light may be irradiated into the cabinet while the light is not biased and uniformity thereof is generally improved. Light reflected from inside the cabinet is emitted to the outside again through the internal transmission window 55, the optical film 70, and the external transmission window 51. Of course, due to the light transmittance of the optical film 70, it is not possible for a large amount of light to be reflected and emitted to the outside, but the absolute amount of light transmitted through the optical film 70 is significantly increased as compared to ordinary times (e.g., when the light emitting module 40 is turned off). For example, referring to the graph illustrated in FIG. 9, when the amount of light transmitted and emitted to the outside (Y-axis) exceeds a predetermined level L1, a condition in which the interior of the cabinet is visible to the human eye may be reached. That is, when light is emitted to a predetermined light amount level L1 or below, objects inside the cabinet would not be identifiable to the human eye. A suitable light transmittance that allows the cabinet to be see-through when a condition is detected may be selected by causing the light emitting module 40 to emit light and changing the light transmittance of the optical film 70, and as a result of research, it was found that, when the total light transmittance of the optical film 70 is in a range of 1% to 15% as described above, the cabinet has characteristics of being opaque in ordinary times and being see-through when a condition is detected based on the human eye. In particular, it was found that the total light transmittance of the optical film 70 is also sufficient to serve as a characteristic of the optical film 70 that is to block external light such as sunlight. In a case in which the total light transmittance of the optical film 70 exceeds 15%, the opaque/see-through characteristics are not favorable. In this way, the amount of light that is transmitted from inside the cabinet to the outside when an external condition, such as whether a person is present in front of the door 30, is detected is sufficient for the interior of the cabinet to be visible to the human eye, and thus it is possible to check the objects stored in the cabinet without opening the door 30.

Figure 4:
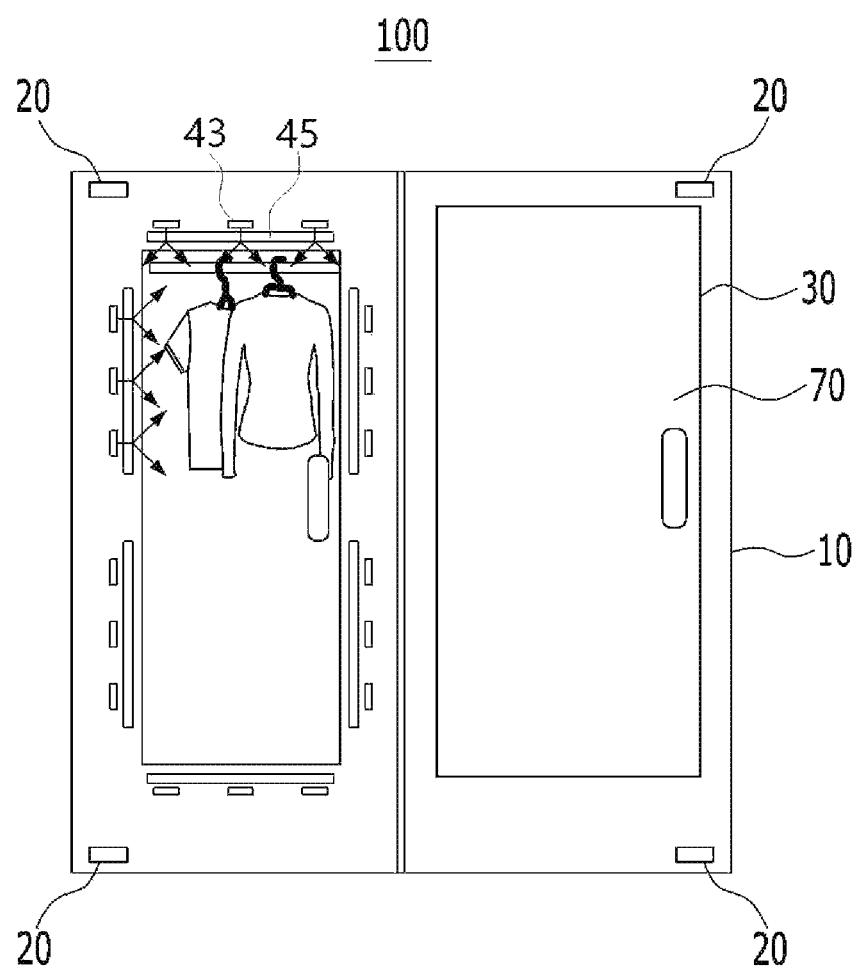
FIG. 4 is a view for describing an example of a light emitting module in the external detection see-through cabinet.

FIG. 4 is a view for describing an example of a light emitting module in the external detection see-through cabinet.

The light emitting module 40 may be provided on an edge of the door 30 as illustrated in FIG. 4 and may emit light between the external transmission window 51 and the internal transmission window 55. An installation position of the light emitting module 40 is not determined only to be the edge of the door 30. In the present embodiment, since the light emitting module 40 emits light between the external transmission window 51 and the internal transmission window 55, it is advantageous to install the light emitting module 40 on the edge of the door 30, and in particular, between the external transmission window 51 and the internal transmission window 55. In the present embodiment, the light emitting module 40 includes a light emitting element 43 provided on an edge of the door 30 to emit light according to a signal from the sensor 20 and a light guide member 45 configured to guide and diffuse the light from the light emitting element 43 to between the external transmission window 51 and the internal transmission window 55. An LED may be used as the light emitting element 43, and as illustrated in FIG. 4, a plurality of light emitting elements 43 may be installed along the edge of the door 30. The light guide member 45 may be a bar-shaped member made of a resin material. For example, a member made of the same material as a light guide plate used in the field of display devices may be used as the light guide member 45. For example, as illustrated in FIG. 4, a plurality of light emitting elements 43 may be disposed along a circumference of the edge of the door 30, and the bar-shaped light guide member 45 may be provided at each side of the edge of the door.

Figure 5:
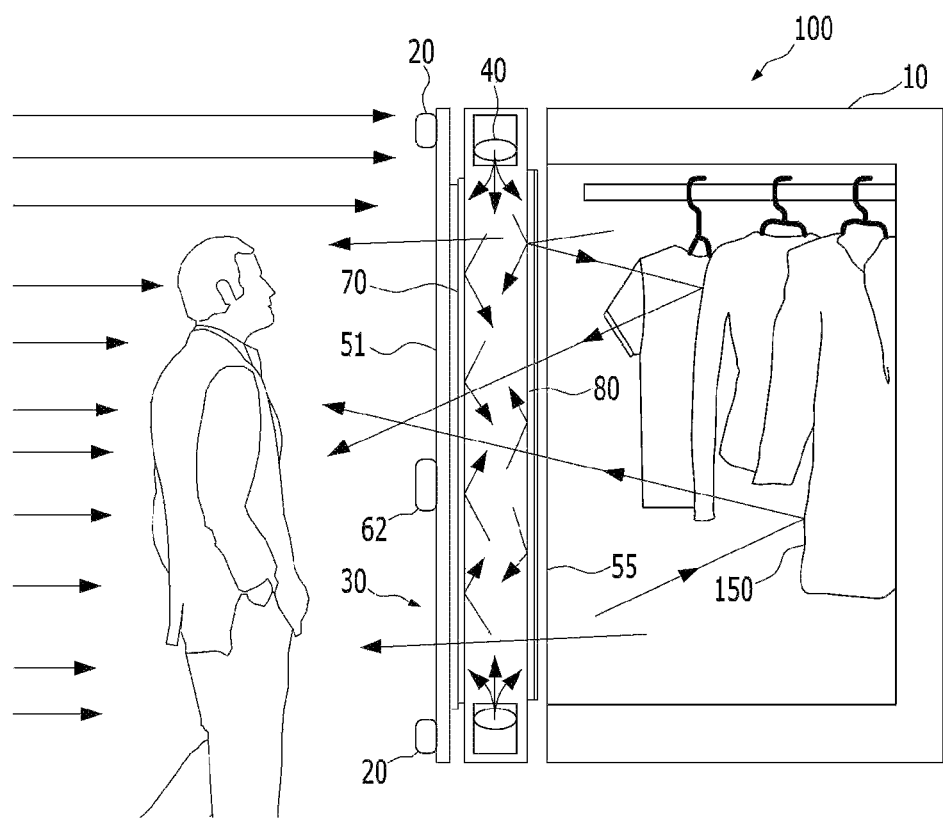
FIG. 5 is a view for describing a cabinet having an external detection see-through door according to another embodiment.

FIG. 5 is a view for describing a cabinet having an external detection see-through door according to another embodiment.

In the present embodiment, optical films 70 and 80 include an external optical film 70 provided on the external transmission window 51 and an internal optical film 80 provided on the internal transmission window 55. The external optical film 70 is provided on an inner side surface of the external transmission window 51, and the internal optical film 80 is provided on an outer side surface of the internal transmission window 55. Here, inner and outer sides are defined such that a side closer to the cabinet body 10 is referred to as the inner side. The optical films may also be arranged differently from the above, but the optical films being configured as described above may be more advantageous in protecting the optical films 70 and 80. In the present embodiment, the internal optical film 80 has a light transmittance higher than that of the external optical film 70. The external optical film 70 may include one or more first reflective films, and the internal optical film 80 may include one or more second reflective films. The total light transmittance due to the one or more first reflective films may be preferably in a range of 1% to 15% to be advantageous for securing the above-described opaque/see-through characteristics, and the total light transmittance due to the one or more second reflective films may be preferably 50% or higher. Unlike the reflective films, a method of depositing and coating a reflective material (e.g., aluminum) on the transmission windows 51 and 55 may also be used. Due to the optical films 70 and 80, in ordinary times, the door 30 may look like a mirror and the cabinet is not see-through.

The sensor 20 may have different kinds of sensors (e.g., a light sensor, a movement sensor, a sound sensor) that correspond to a plurality of specific conditions outside the cabinet. Therefore, the sensor 20 may detect an approach of a person, a specific movement of a person, a simple change in an intensity of light over time, a voice of a person, or the like and generate a signal, or a user may set such a detection function. The light emitting module 40 may emit light or increase an amount of emitted light from the original light emitting condition according to the signal from the sensor 20. Of course, the light emitting module 40 may emit different colored lights, and for example, an RGB LED may be used as the light emitting module 40.

When a condition is detected by the sensor 20, as light is output from the light emitting module 40 and repeatedly reflected between the external optical film 70 and the internal optical film 80, light is irradiated into the cabinet through the internal optical film 80 whose light transmittance is higher, the amount of light that is reflected from inside the cabinet, transmitted through the internal optical film 80, and then transmitted through the external optical film 70 is increased such that an illuminance difference between the interior of the cabinet and the outside is decreased, and thus the cabinet may be see-through. Since the light is diffused as the light is repeatedly reflected, formation of shadows of articles stored inside the cabinet may be prevented, and the objects may be seen more clearly.

Meanwhile, the sensor 20 may also directly receive a signal from a user to control the light emitting module 40. For example, the sensor 20 may receive an external signal (e.g., a remote controller signal from a user) and cause the light emitting module 40 to emit light.

Unlike the above-described non-contact type sensor 20, as illustrated in FIG. 5, a touch pad 62 may be installed on the door 30 to be connected to the light emitting module 40 via a wire or wirelessly, and the door 30 may be set to be see-through when the user touches the touch pad 62.

The external detection see-through door 30 may further include a switch configured to turn a power supply to the sensor 20 or the light emitting module 40 on and off or turn the sensor 20 on and off to turn the see-through function on and off, or the touch pad may have such functions. Although the light emitting module 40 emits light due to the sensor 20 and the cabinet becomes see-through when an external condition is detected, the switch may be used in a case in which it is necessary to set a continuous see-through condition to allow the user to check the interior of the cabinet in ordinary times regardless of whether an external condition is detected.

Also, only a specific user of the external detection see-through cabinet 100 may possess a key that may be approved by the sensor, and the light emitting module 40 may emit light and cause the cabinet to be see-through only when the key approaches the door 30. In this way, security may be ensured. The key may be a separate key, a wearable device in the form of a watch, a key using a smartphone application, a simple barcode, a quick response (QR) code, or may have various other forms.

Figure 6:
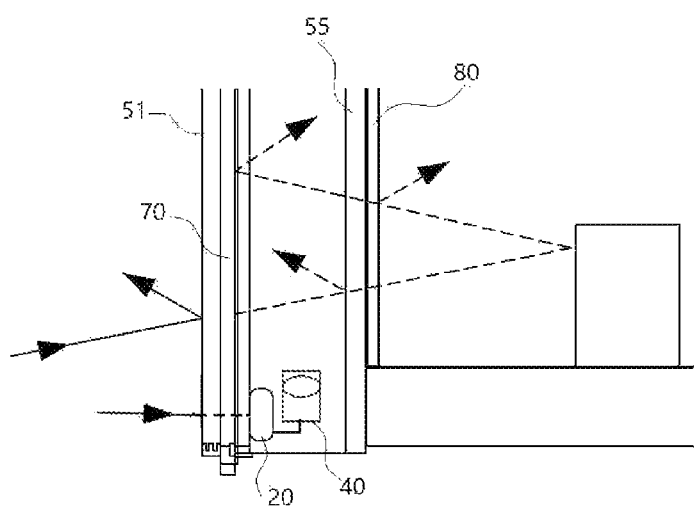
FIG. 6 is a view for describing a cabinet having an external detection see-through door according to still another embodiment.

FIG. 6 is a view for describing a cabinet having an external detection see-through door according to still another embodiment.

In the present embodiment, the sensor 20 is provided between the external optical film 70 and the internal optical film 80. Therefore, light from the outside is transmitted through the external optical film 70 and detected by the sensor 20. In ordinary times, predetermined light may be irradiated from the sensor 20 toward the external optical film 70, or the amount of light emitted from the light emitting module 40 may be set to an amount of light that improves a detecting characteristic of the sensor 20 although the cabinet is not see-through, and in this way, the light emitting module 40 may be caused to emit light.

Alternatively, the light transmittance of the external optical film 70 may be adjusted to maintain the opaque characteristic well due to the amount of light from the light emitting module 40 or the sensor 20 in ordinary times and to exhibit the see-through characteristic due to an increase in the amount of light from the light emitting module 40 when a specific external condition is detected.

Figure 7:
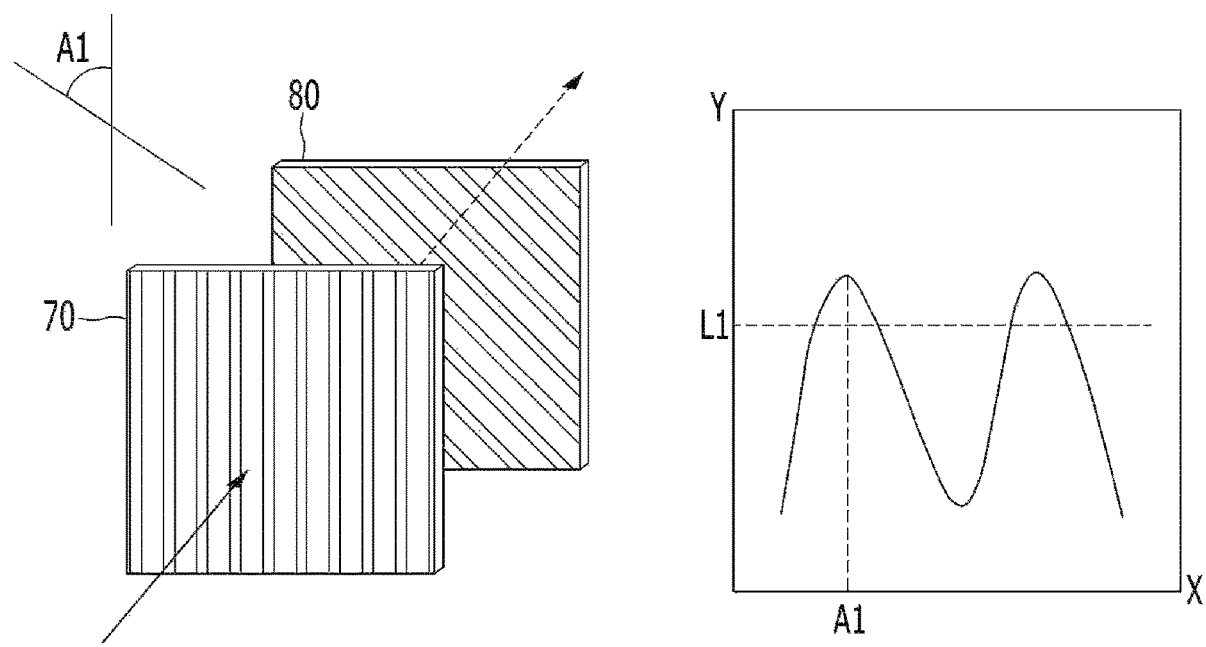
FIG. 7 is a view for describing a cabinet having an external detection see-through door according to yet another embodiment.

FIG. 7 is a view for describing a cabinet having an external detection see-through door according to yet another embodiment.

In the present embodiment, optical films 70 and 80 include an external optical film 70 provided on the external transmission window 51 and an internal optical film 80 provided on the internal transmission window 55. At least one of the external optical film 70 and the internal optical film 80 may be a reflective polarizing film. The reflective polarizing film reflects a portion of incident light and transmits a portion thereof, and the transmitted light is polarized along a polarization axis. In a case in which the reflective polarizing film is used for both the external optical film 70 and the internal optical film 80, as shown in the graph of FIG. 7, the amount of transmitted light may be changed (Y-axis) according to changes in an angle A1 formed between polarization axes. Here, the light from the light emitting module 40, which has gone through the reflection process, is reflected and polarized while passing through the internal optical film 80, and the light reflected from inside the cabinet is reflected and polarized while passing through the internal optical film 80 again and is incident on the external optical film 70 and reflected and polarized. The light emitted through the external optical film 70 may vary according to changes in the angle A1 formed between the polarization axes, and a suitable angle A1 that corresponds to the light amount L1, which serves as a boundary where the cabinet is see-through when the light emitting module 40 emits light and is opaque when the light emitting module 40 is turned off, is selected.

In this way, according to the external detection see-through cabinet 100, since the external detection see-through cabinet 100 becomes see-through when an external condition is detected, objects stored in the cabinet may be checked without opening the door. Also, the present disclosure may not only be applied to cabinets but also be applied to doors of general buildings, and in this case, since a user may recognize a person or situation on the other side of the door when approaching the door even without opening the door, it is convenient and also beneficial for safety.

The above-given description of the present disclosure is merely illustrative, and those of ordinary skill in the art to which the present disclosure pertains should understand that the present disclosure may be easily modified in other specific forms without changing the technical idea or essential features of the present disclosure. Therefore, the embodiments described above should be understood as being illustrative, instead of limiting, in all aspects. For example, each element described as a single type may also be embodied in a distributed manner, and likewise, elements described as being distributed may also be embodied in a combined form.

The scope of the present disclosure is defined by the claims below, and the meaning and scope of the claims and all changes or modified forms derived from their equivalents should be interpreted as belonging to the scope of the present disclosure.

MODES OF THE DISCLOSURE

The modes of the disclosure have been described above in the description of the best mode of the disclosure.

The invention claimed is:

1. An external detection see-through door of a cabinet that stores objects, the external detection see-through door comprising:
    a transmission window;
    a sensor configured to detect a specific external condition in front of the transmission window;
    a light emitting module configured to increase an amount of emitted light according to a signal from the sensor, which has detected the specific external condition, to increase an amount of light that is reflected from inside the cabinet and heads toward the transmission window; and
    an optical film that is provided on the transmission window and has a light transmittance that prevents the cabinet from being see-through from the outside before the sensor detects the specific condition and allows the cabinet to be see-through from the outside due to light that is reflected from inside the cabinet and transmitted through the transmission window and the optical film due to the light emitting module increasing the amount of emitted light according to the signal from the sensor that has detected the specific external condition,
    wherein the transmission window includes an external transmission window and an internal transmission window that are opposite to each other, the light emitting module is provided on an edge of the door to emit light between the external transmission window and the internal transmission window, the optical film includes an external optical film provided on the external transmission window and an internal optical film that is provided on the internal transmission window and has a light transmittance higher than that of the external optical film, and the external optical film and the internal optical film are reflective polarizing films.

2. The external detection see-through door of claim 1, wherein the sensor includes at least one of a light sensor configured to detect a change in light due to an external object in front of the transmission window and a touch sensor configured to detect the external object due to a touch by the external object.

3. The external detection see-through door of claim 1, including a switch configured to turn a power supply to the sensor or the light emitting module on and off or turn the sensor on and off to turn a see-through function on and off.

4. The external detection see-through door of claim 1, wherein
    the light emitting module includes a light emitting element provided on the edge of the door to emit light according to the signal from the sensor and a light guide member configured to guide and diffuse the light from the light emitting element to between the external transmission window and the internal transmission window.

5. The external detection see-through door of claim 1, wherein:
    the external optical film includes one or more first reflective films and the internal optical film includes one or more second reflective films;
    total light transmittance due to the one or more first reflective films is in a range of 1% to 15%; and
    total light transmittance due to the one or more second reflective films is 50% or higher.

6. An external detection see-through cabinet that stores objects, the external detection see-through cabinet comprising:
- a cabinet body configured to store objects; and
- an external detection see-through door installed on the cabinet body, the external detection see-through door including:
- a transmission window;
- a sensor configured to detect a specific external condition in front of the transmission window;
- a light emitting module configured to increase an amount of emitted light according to a signal from the sensor, which has detected the specific external condition, to increase an amount of light that is reflected from inside the cabinet and heads toward the transmission window; and
- an optical film that is provided on the transmission window and has a light transmittance that prevents the cabinet from being see-through from the outside before the sensor detects the specific condition and allows the cabinet to be see-through from the outside due to light that is reflected from inside the cabinet and transmitted through the transmission window and the optical film due to the light emitting module increasing the amount of emitted light according to the signal from the sensor that has detected the specific external condition, wherein the transmission window includes an external transmission window and an internal transmission window that are opposite to each other, the light emitting module is provided on an edge of the door to emit light between the external transmission window and the internal transmission window, the optical film includes an external optical film provided on the external transmission window and an internal optical film that is provided on the internal transmission window and has a light transmittance higher than that of the external optical film, and the external optical film and the internal optical film are reflective polarizing films.

* * * * *